US006276180B1

United States Patent
Hirschvogel et al.

(10) Patent No.: US 6,276,180 B1
(45) Date of Patent: Aug. 21, 2001

(54) METHOD AND APPARATUS FOR MANUFACTURING A SHIFT GEARWHEEL AND SHIFT GEARWHEEL MANUFACTURED BY SAME

(75) Inventors: Manfred Hirschvogel, Fuchstal-Leeder; Peter Kettner, Denklingen; Hubert Nägele, Fuchstal-Au, all of (DE); Oskar Müller, Wollerau (CH); Albin Giger, Jona (CH); Hand-Ruedi Honegger, Gallenkappel (CH)

(73) Assignees: Hirschvogel Umformtechnik GmbH, Denklingen (DE); Schmid Heinrich Maschinen-und Werkzeugbau AG, Jona (CH)

( * ) Notice: Subject to any disclaimer, the term of this patent is extended or adjusted under 35 U.S.C. 154(b) by 0 days.

(21) Appl. No.: 09/502,209

(22) Filed: Feb. 11, 2000

Related U.S. Application Data

(63) Continuation of application No. PCT/EP98/04831, filed on Aug. 3, 1998.

(30) Foreign Application Priority Data

| Aug. 13, 1997 | (DE) | 197 35 109 |
| Oct. 9, 1997 | (DE) | 197 44 639 |

(51) Int. Cl.$^7$ .................................................. B21H 05/00
(52) U.S. Cl. .................................................. 72/115; 72/67
(58) Field of Search .................................. 72/67, 85, 89, 72/102, 115; 29/893.32

(56) References Cited

U.S. PATENT DOCUMENTS

| 3,846,999 | * 11/1974 | Connell | 72/102 |
| 4,700,446 | 10/1987 | Schmid et al. | 29/159 |
| 5,263,238 | 11/1993 | Cooper | 29/444 |

FOREIGN PATENT DOCUMENTS

| 3427156 A1 | 2/1986 | (DE) . |
| 2-30350 | * 1/1990 | (JP) | 72/67 |

OTHER PUBLICATIONS

"Forging Ahead", Engineering, Bd. 231, No. 11, London, GB, 1991, p. 46.

Jon Larsen, "Orbital Cold Forging Applied To The Manufacture Of Complex Automotive Transmission Components", Paper No. 45, Conf. Proc. 9, International Cold Forging Congress, May 22–26, 1995.

* cited by examiner

Primary Examiner—Lowell A. Larson
(74) Attorney, Agent, or Firm—Fitzpatrick, Cella, Harper & Scinto

(57) ABSTRACT

The subject matter of the invention is a method of manufacturing a shift gearwheel (1) with coaxially disposed and axially projecting shift teeth (5), which have an axial undercut. To said end, a shift gearwheel blank (1) having preformed shift teeth (5) and a forming tool (16) having corresponding tooth recesses (18) are brought into engagement and set in gyratory motion relative to one another. Further described are a device for effecting the method and a shift gearwheel (1), which may be manufactured by the method. The latter is notable for the fact that the flanks (23, 24) of the shift teeth (5) upon completion of the manufacturing method are concave so as to produce an undercut.

14 Claims, 4 Drawing Sheets

METHOD AND APPARATUS FOR MANUFACTURING A SHIFT GEARWHEEL AND SHIFT GEARWHEEL MANUFACTURED BY SAME

CROSS REFERENCE TO RELATED APPLICATION

This is a Continuation of copending Application PCT/EP98/04831 filed Aug. 3, 1998.

BACKGROUND OF THE INVENTION

1. Field of the Invention

The invention relates to a method of manufacturing a shift gearwheel with coaxially disposed and axially projecting shift teeth, which have an axial undercut.

2. Description of the Related Art

Shift gearwheels of the type indicated above are used, for example, in synchromesh transmissions for motor vehicles. For general appreciation, a cutout of a synchronizing unit belonging to prior art is first described with reference to FIGS. 1 and 2a–c.

FIG. 1 shows an exploded view of a loose wheel 1 with clutch body 7, a synchronizing ring 2, a sliding sleeve 3 and a synchronizer body 4.

The loose wheel 1 is provided with an external gearing 20. Integrally formed on its end face is a clutch body 7. The clutch body 7 comprises a coaxial ring of shift teeth 5, which—starting from a coaxial groove 6 forming an undercut—extend in axial direction to the left and project beyond the end face of the loose wheel 1. The shift teeth 5 have an axial undercut, such that the width of said shift teeth 5—starting from the tooth tip—diminishes towards the base of the groove 6. The shift teeth 5 at their tip end have a roof slope, which terminates at an annular surface 14 extending at right angles to the axis. Raised up from said annular surface 14 is a coaxial friction cone 8.

The synchronizing ring 2 at its outside is provided with a ring of shift teeth 9, which extend in axial direction between two annular surfaces 10 and 11 extending at right angles to the axis. The inner surface of the synchronizing ring 2 matches the friction cone 8 on the clutch body 7.

The sliding sleeve 3 is provided with axially extending shift teeth 12 and arranged so as to be axially displaceable but non-rotatable on the synchronizer body 4. To said end, the synchronizer body 4 in turn has axially extending teeth 13, which mesh with the inner shift teeth 12 of the sliding sleeve 3. The shift teeth 12 of the sliding sleeve likewise have an undercut close to their two axial ends.

FIG. 2 shows the positions of the shift teeth of the transmission elements shown in FIG. 1 in three different shift positions, and indeed as a developed sectional view.

FIG. 2a shows the neutral position of the synchronizing shift device. Here, the sliding sleeve 3 is in centre position. The loose wheel 1 with its clutch body and a further loose wheel (not shown) is freely rotatable relative to the synchronizer body. The shift teeth 12 of the sliding sleeve 3, the shift teeth 9 of the synchronizing ring 2 and the shift teeth of the clutch body have clearance relative to one another.

FIG. 2b shows the transmission elements in blocking position. The sliding sleeve 3 and the synchronizing ring 2 have been displaced to the right. The synchronizing ring 2 therefore comes into frictional engagement with the friction cone 8 of the clutch body 7 and is rotated so that the shift teeth 12 of the sliding sleeve and the shift teeth 9 of the synchronizing ring 2 lie with their roof slopes against one another.

FIG. 2c shows the "gear engaged" position. Here, the sliding sleeve has been slid so far to the right that the shift teeth 12 of the sliding sleeve 3 engage fully through the shift teeth 9 of the synchronizing ring 2 and moreover project into the shift teeth 5 of the clutch body 7. It may be seen that the undercuts of the shift teeth 12 of the sliding sleeve 3 upon transmission of a torque and the undercuts of the shift teeth 5 of the clutch body 7 engage one behind the other, thereby preventing an axial separation of the transmission elements. This is the purpose of the undercuts.

A plurality of methods of manufacturing shift gearwheels with undercut shift teeth are already known.

Thus, the prior publication DE 20 40 413 A describes a known method whereby tapered gearwheels with undercut teeth may be manufactured in that teeth with parallel extending tooth flanks are first manufactured by rough-pressing and then finish-edged so as to form a roof shape.

A method of manufacturing a synchronizing component provided with an abridged gearing with undercut teeth for shift transmissions is further known (DE 34 27 156 C2), in which rough-forging is used first to manufacture a semifinished product, the abridged gearing of which comprises teeth having an overmeasure exceeding the height of the finished tooth tip. Then, by means of a plurality of sizing impacts the cold semifinished product is worked in such a way that first the tooth tips are rough-edged, during which the teeth are supported at their radially outer sides against the forging die. At the same time, by means of the rough-edging or a further sizing impact a strain-hardening is produced in each case in the tooth region of the teeth. Then the tooth tips are finish-edged so that they have a roof shape and the tooth flanks have the inclination corresponding to their undercut.

Finally, a method of machining clutch gearwheels for motor vehicle transmissions is additionally known (DE 34 38 454 A1), whereby in a first working step a blank of a round rod is formed by cold- or hot-forging from a material which is deformable under pressure. In a second working step, the blank is pressed by means of a forging die. In said manner, the cross section having the defined final dimensions and at the same time a taper-face projection are obtained. In a third working step the taper-face projection is converted into a tooth shape. In a fourth working step the tooth shape is pressed into the forging die from an end face of the opposite end of the taper-face projection so that the tooth shape is provided with an undercut.

An object of the invention is to indicate a non-cutting method of manufacturing a shift gearwheel having axially undercut shift teeth, which is particularly easy to effect and suitable for mass production.

According to one aspect of the invention, there is provided a novel method of manufacturing a shift gearwheel with coaxially disposed and axially projecting shift teeth and which have an axial undercut. This method includes a first step of bringing into mutual engagement, a shift gearwheel blank having coaxially disposed and axially projecting preformed shift teeth, and a forming tool having corresponding axial tooth recesses, such that the preformed gearweel blank shift teeth become engages in the forming tool tooth recesses with a clearance; a second step of setting the shift gearwheel blank and the forming tool in gyratory motion relative to one another in such a way that the contours of the tooth recesses move in a pressing and material-shaping manner over the flanks of the performed gear wheel shift teeth so as to form an undercut; and a third step of separating the thus machined shift gearwheel blank and the forming tool from one another.

The method according to the invention is particularly notable for the fact that it may be effected continuously throughout without interruption of the individual teeth and leads to reproducible products. The method is simple as well as time- and cost-saving.

Advantageous refinements of the method according to this aspect of the invention are described hereinafter.

The invention in another aspect relates to a device, with which the previously described method may be effected. According to a further refinement, the shift gearwheel blank is maintained stationary and the forming tool is made to simultaneously execute a rotation about an axis of nutation, a nutating movement about a vertical axis of rotation and a lifting movement in the axial direction.

According to a still further refinement, the shift gearwheel is caused to execute a lifting movement in the axial direction while the forming tool simultaneously executes a nutating movement.

In yet another refinement, the invention relates to a shift gearwheel manufactured by the above described method.

An additional refinement involves successively increasing the angle of nutation between the shift gearwheel blank and the forming tool from 0° up to a maximum angle of nutation, maintaining the angle at the maximum angle of nutation and then reducing the angle back down to 0°.

Yet another refinement involves carrying out the gyratory motion first in one direction of nutating movement and then repeating the gyratory motion in the opposite direction of nutating movement.

BRIEF DESCRIPTION OF THE DRAWINGS

The invention is described below by way of example with reference to drawings. Said drawings show.

DETAILED DESCRIPTION OF THE PREFERRED EMBODIMENTS

Figure 1:
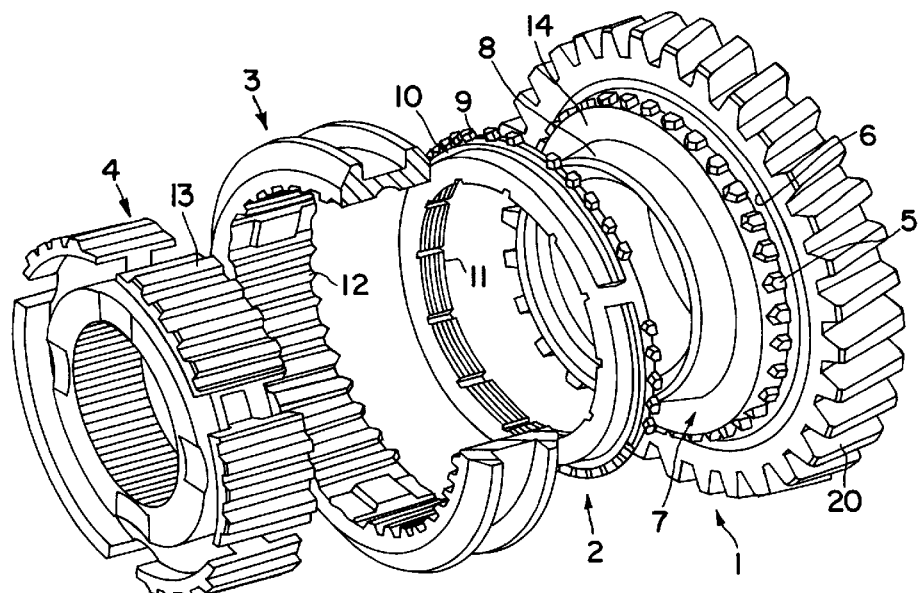
FIG. 1 the prior art in the form of a perspective exploded view of parts of a synchronizing unit for a motor vehicle, wherein one of said parts is a shift gearwheel having shift teeth with an undercut.
Figure 2A:
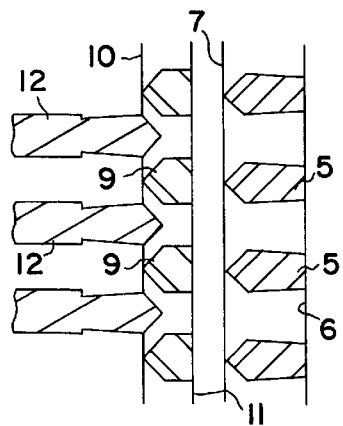
FIGS. 2a–c developed sectional views of the shift teeth of elements of the transmission unit shown in FIG. 1 in three different shift positions.
Figure 2B:
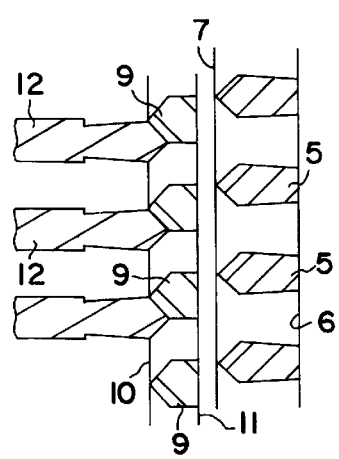
Figure 2C:
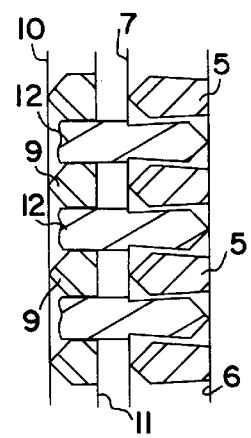
Figure 3:
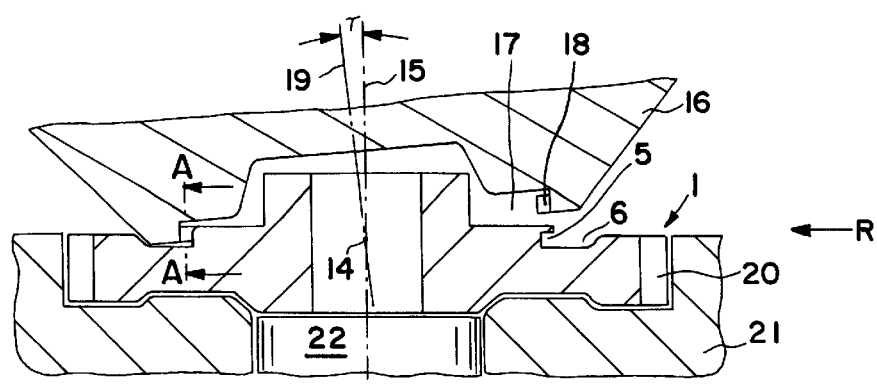
FIG. 3 a section through a diagrammatically illustrated device for manufacturing a shift gearwheel by the method according to the invention.

FIG. 3 shows a receiving part in the form of a bottom die 21 for receiving a shift gearwheel blank and/or the finished shift gearwheel 1 after implementation of the method. For the shift gearwheel 1 in FIGS. 3 to 11 the same reference characters have been used as for the loose wheel 1 with clutch body 7 in FIG. 1. The axis of the shift gearwheel 1 is denoted by 15 and is referred to hereinafter as "axis of rotation".

Disposed above the bottom die 21 is a forming tool 16 having at its underside a circular hollow 17, at the edge of which are situated tooth recesses 18 which are open both axially towards the end face of the forming tool 16 and in a radially inward direction. The forming tool may be set by a drive (not shown) in gyratory motion relative to the bottom die 21, wherein the angle of nutation τ is adjustable. The axis of nutation is denoted by 19. When the angle of nutation τ is greater than 0°, the axis of rotation 15 and the axis of nutation 19 intersect at the point of intersection 14. During implementation of the gyratory motion the axis of nutation 19 rotates about the axis of rotation 15. Thus, the forming tool 16 is in each case at one position in intensive forming contact with the relevant shift teeth 5 of the shift gearwheel 1, while at the axially opposite point a—depending on the angle of nutation τ—partial or full separation between the forming tool 16 and the corresponding shift teeth 5 of the shift gearwheel 1 occurs.

Upon completion of the method and removal of the forming tool 16, the finished shift gearwheel 1 may be pushed out of the bottom die 21 by means of an ejector 22.

FIGS. 4–9 show, on the left, a section A—A through a shift tooth 5 of the shift gearwheel 1 in FIG. 3 from the viewing direction indicated by the arrow R in FIG. 3. This means that, in each case, the rear shift tooth 5 is viewed. Next to this, on the right, FIGS. 4–10 each show a circle which reveals the position x of the axis of nutation 19 above the point of intersection between the axis of nutation 19 and the axis 15 of the shift gearwheel 1. From the position x of the axis of nutation 19 it is possible to infer the angle of nutation τ.

Figure 4:
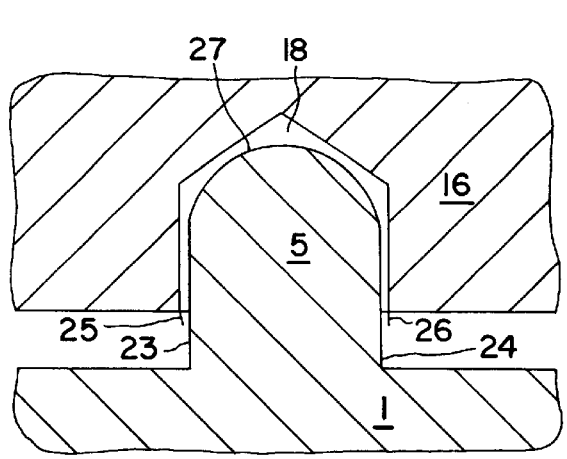
FIGS. 4–9 in each case a section A—A through a shift tooth of the shift gearwheel manufactured by the device in FIG. 3 in successive manufacturing stages of the machining sequence.
Figure 4:
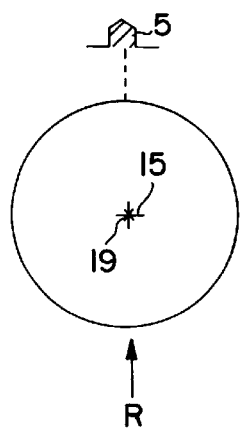

FIG. 4 shows the state when the forging die is closed. This means that the forming tool 16 is placed, with the angle of nutation τ=0°, onto the shift gearwheel 1 initially provided in the form of a blank. The shift gearwheel blank 1 is provided with preformed shift teeth 5. The latter have parallel flanks 23 and 24. At their axial end they are provided with a rounded portion 27. Instead of the latter, the preformed shift teeth 5 may however already have a roof shape. The forming tool 16 is provided with corresponding tooth recesses 18, which in turn have a wedge-shaped base in order to form a roof shape on the preformed shift teeth 5, if they do not already have one. The boundary edges 25 and 26 of the tooth recesses 18 are—as will be described below—used to form the undercuts. As may be seen from the circle situated next to the sectional view, the axis of rotation 15 and the axis of nutation 19 here extend coaxially without clearance (τ=0°).

A machining sequence of the method of manufacturing a shift gearwheel is described below by way of example and with reference to FIGS. 5–9.

Figure 5:
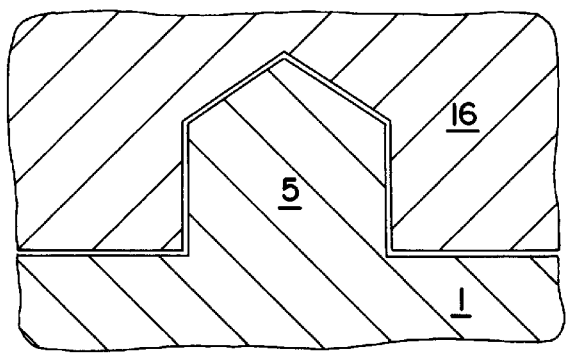
Figure 5:
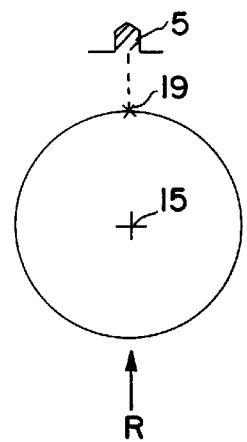

FIG. 5 shows a first manufacturing stage of the machining sequence, during which a maximum angle of nutation τ is adjusted. This is apparent from the position x of the axis of nutation 19 on the circle situated next to the sectional view. Here, the axis of nutation 19 is situated above the axis 15. This means that, as yet, no circular movement of the forming tool 16 about the axis of rotation 15 has occurred. During said first manufacturing stage a slight roof shape is formed on the preformed shift tooth 5; the shift tooth 5 is moreover slightly widened.

Figure 6:
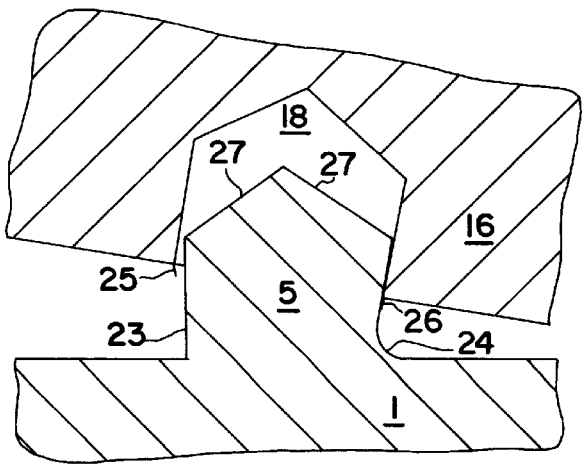
Figure 6:
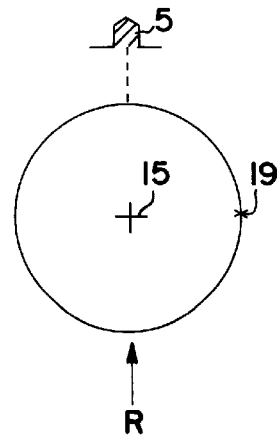

FIG. 6 shows the next stage of the machining sequence, during which once more the maximum angle of nutation τ is adjusted. Here, the axis of nutation 19 is situated to the right of the axis 15. This means that the axis of nutation 19 and, with it, the forming tool 16 have executed a circular movement through 90° compared to FIG. 5. It is evident from the sectional view that the boundary edge 26 of the tooth recess 18 is forming an undercut on the preformed shift tooth 5. The tooth flank 24 is now no longer straight but concave.

Figure 7:
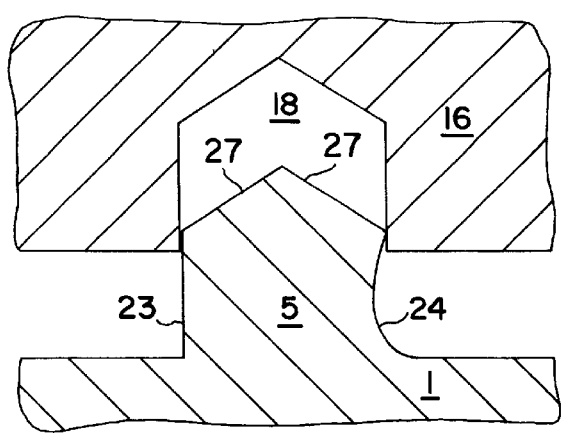
Figure 7:
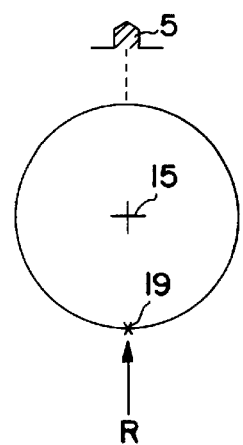

FIG. 7 shows the axis of nutation 19 after it has executed a circular movement of 180° about the axis of rotation 15 compared to FIG. 5. The forming tool 16 at the point of the presently illustrated shift tooth 5 has lifted relative to the shift gearwheel blank 1 without a separation of shift tooth 5 and tooth recess 18 having been effected.

Figure 8:
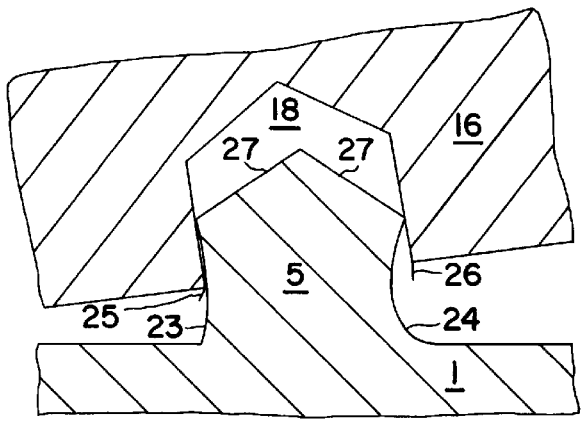
Figure 8:
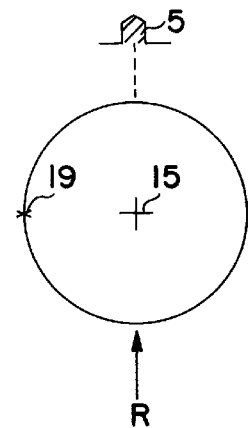

In FIG. 8, the axis of nutation 19 has executed a circular movement of 270°. Here, the forming tool 16 is lowered again in the direction of the partially still preformed shift tooth 5 and is forming on the left flank 23 of the latter a concave undercut. The tooth flank 23 also is therefore no longer straight but now likewise concave.

Figure 9:
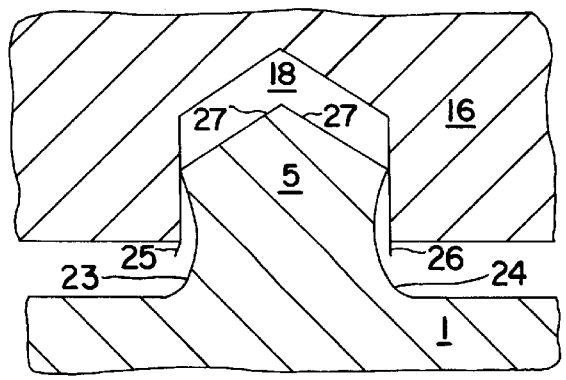
Figure 9:
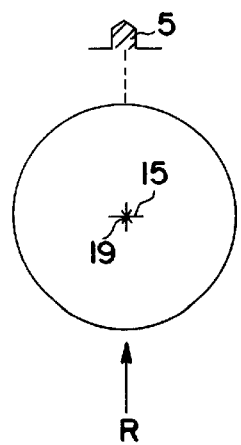

FIG. 9 shows the finished shift tooth with undercut, wherein the angle of nutation τ is reset to 0°. The axis of rotation 15 and the axis of nutation 19 again extend parallel to one another and without clearance.

During practical implementation of the method, the angle of nutation in the course of a plurality of nutation sequences is successively increased from 0° up to the maximum final angle. Then a plurality of nutation sequences are effected while maintaining the final angle. Finally, the angle of nutation in the course of effecting a plurality of further nutation sequences is successively reduced back down to 0°.

To guarantee that the undercut is formed as symmetrically as possible on the shift teeth 5, it is possible in practice for the same operation to be repeated once more, wherein the circular movement is effected in the opposite direction.

The maximum angle of nutation depends upon the nutating machines used. Currently, with the latter a maximum angle of nutation of 2° is adjustable. In the case of the present method, the desired undercut angle on the shift teeth corresponds to the maximum angle of nutation at which the device for effecting the method operates.

When greater undercut angles are required, either the nutating machine has to be suitably re-designed or the flanks 30 and 31 of the tooth recesses 18 in the forming tool 16 are in turn provided with a suitable undercut. In said case, the maximum angle of nutation and the undercut angle of the flanks 30, 31 of the tooth recesses 18 sum up to the achievable undercut angle on the shift teeth 5. Thus, for example, the tooth recesses 18 may be provided with an undercut angle of 2.3° in order, together with the maximum angle of nutation of 2°, to realize the undercut angle of 4.3° on the shift teeth 5.

Figure 10:
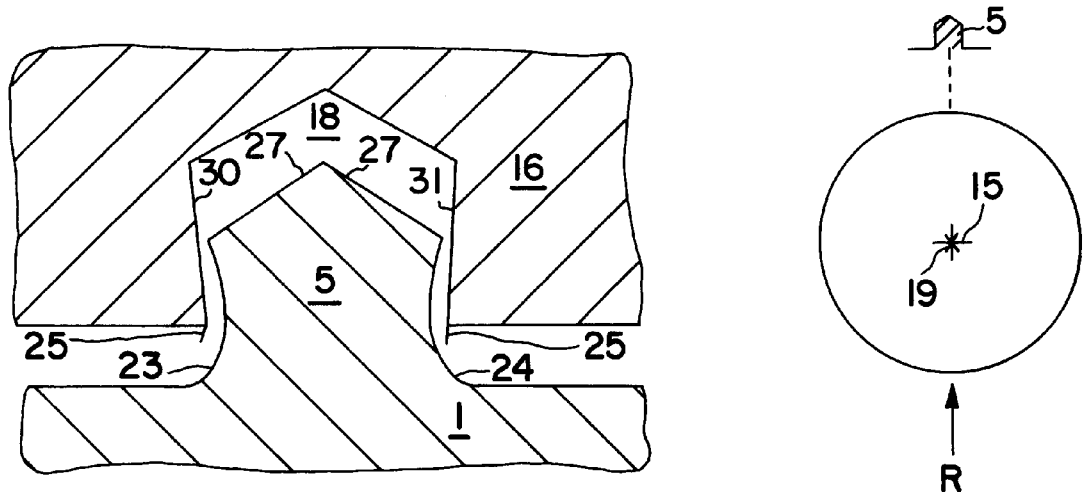
FIG. 10 a view as in FIG. 9, wherein the tooth recess of the forming tool in turn has an undercut.

FIG. 10 shows a tooth recess 18 with undercut. Otherwise, FIG. 10 corresponds to FIG. 9.

Figure 11:
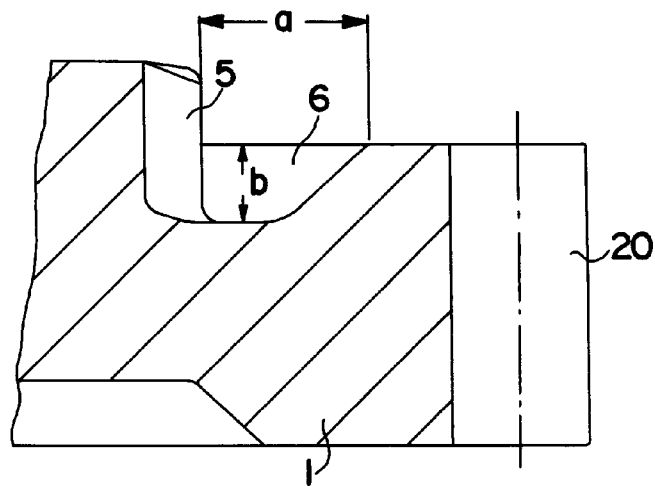
FIG. 11 a partial section through a shift gearwheel with shift tooth, which shows in particular the annular groove and the size ratio with regard to the shift teeth.

FIG. 11 shows an enlarged partial section through a part of a finished shift gearwheel 1. Here, it is particularly evident that the shift teeth 5 are partially countersunk in the groove 6, with the result that the shift gearwheel 1 as a whole may be of a relatively flat construction. With the conventional methods, it is impossible to go below a specific ratio of groove width a to groove depth b. With the method according to the invention, said ratio is more advantageous in view of the desired aim to make the shift gearwheels of the presently discussed type as flat as possible.

Finally, it should be mentioned that particularly FIGS. 3–10 show the essential features such as angle of nutation and undercut in a highly exaggerated manner. If illustrated true to scale, said features would be barely discernible.

It should also be mentioned that the data regarding the maximum angle of nutation and the number of nutating revolutions are merely by way of example and may be altered without thereby affecting the essential substance of the invention.

It is moreover additionally pointed out that the method described above, the bottom die 21 and the forming tool 16 may equally be used in various types of nutating press. The most common nutating presses may be classified, e.g. according to their tool movements, into three types.

In the nutating press of type 1, the bottom die 21 with the shift gearwheel blank 1 inserted therein executes a driven rotational movement about the axis of rotation 15. The top forming tool 16 rotates in synchronism with the rotational movement of the bottom die 21 about the axis of nutation 19 inclined by the angle of nutation τ. The translatory movement, which corresponds to the lifting movement during the forming operation, is likewise initiated hydraulically by the top forming tool 16. If the rotational movement of the forming tool 16 is not driven, i.e. if the forming tool 16 co-rotates with the shift gearwheel 1 freely about the axis of nutation 19, then said nutating press is described as type 1A. If, on the other hand, the rotational movement of the forming tool 16 is additionally driven, said nutating press is described as type 1B.

The nutating press of type 2 has a fixed bottom die 21 which is incapable of executing either translatory or rotational movements. The shift gearwheel 1 is stationary throughout the machining operation. Instead, the top forming tool 16 executes a total of three movements: the rotation about the axis of nutation 19, the nutating movement about the vertical axis of rotation 15 and the hydraulically driven lifting movement in axial direction.

Nutating presses of type 3, for which the method was also described above with reference to the drawings, are however the most common type of nutating press. Here, the hydraulically driven lifting movement is effected by a cylinder in the bottom part of the machine. The nutating movement is initiated by the top forming tool 16, while bottom die 21 and shift gearwheel 1 remain stationary.

Irrespective of the type of nutating press used, all that matters about the according to the invention is that the forming tool 16 executes a gyratory movement relative to the shift gearwheel and/or shift gearwheel blank 1. How the individual components of motion of the nutating movement are allocated to the various tool parts of the nutating press used in each case is, in said case, fundamentally irrelevant.

What is claimed is:

1. A method of manufacturing a shift gearwheel with coaxially disposed and axially projecting shift teeth, which have an axial undercut, said method comprising the steps of:
   a) bringing into mutual engagement, a shift gearwheel blank having coaxially disposed and axially projecting preformed shift teeth, the flanks of which extend in an axial direction, and a forming tool having corresponding axial tooth recesses, wherein the preformed shift teeth of the shift gearwheel blank become engaged into the tooth recesses with a clearance;
   b) setting the shift gearwheel blank and the forming tool in gyratory motion relative to one another in such a way that contours of the tooth recesses in the forming tool move in a pressing and material-shaping manner over the flanks of the performed shift teeth of the shift gearwheel blank so as to form an undercut; and
   c) separating the thus machined shift gearwheel blank and the forming tool from one another.

2. A method according to claim 1 wherein,
   during the step of bringing the shift gearwheel blank and the forming into mutual engagement, maintaining them coaxially aligned with each other.

3. A method according to one of claims 1 and 2 wherein, during the step of separating the shift gearwheel blank and the forming tool, maintaining them coaxially aligned with each another.

4. A method according to one of claims 1 and 2 wherein, during the step of setting the shift gearwheel blank and the forming tool in gyratory motion, setting the shift gearwheel blank in driven rotational movement about an axis of rotation such that the forming tool co-rotates in synchronism with the rotational movement of the shift gearwheel blank about an axis of nutation inclined by an angle of nutation.

5. A method according to claim 4 wherein, the forming tool (16) is additionally driven for rotational movement.

6. A method according to one of claims 1 and 2 wherein, during the step of setting the shift gearwheel blank and the forming tool in gyratory motion relative to one another, maintaining the shift gearwheel blank stationary while causing the forming tool to simultaneously execute (i) a rotation about an axis of nutation, (ii) a nutating movement about a vertical axis of rotation and (iii) a lifting movement in an axial direction.

7. A method according to one of claims 1 and 2 wherein, during the step of setting the shift gearwheel blank and the forming tool in gyratory motion relative to one another, causing the shift gearwheel blank to execute a lifting movement in an axial direction and causing the forming tool to simultaneously execute a nutating movement.

8. A method according to one of claims 1 and 2 wherein, during the step of setting the shift gearwheel blank and the forming tool in gyrating motion relative to one another, successively increasing the angle of nutation between the shift gearwheel blank and the forming tool from 0° up to a maximum angle of nutation, then maintaining a maximum angle of nutation, and thereafter finally reducing the angle of nutation back down to 0°.

9. A method according to one of claims 1 and 2 wherein, the step of setting the shift gearwheel blank and the forming tool in gyratory motion relative to one another, is first effected in the one direction of nutating movement and then repeated in the opposite direction of nutating movement.

10. A shift gearwheel having a ring of axially extending shift teeth and which has been manufactured by the method according to one of claims 1 and 2, said shift gearwheel having teeth shaped in a concave manner to form an undercut, such that an axially projecting tip of each shift tooth is wider than a middle region of the tooth.

11. A device for manufacturing a shift gearwheel with coaxially disposed and axially projecting shift teeth, said device comprising,
a receiving element for receiving a shift gearwheel blank having a ring of preformed, axially extending shift teeth,
a forming tool having a circular hollow, at the edge of which are situated tooth recesses which are open both axially towards an end face of the forming tool and which extend in a radially inward direction, and
a drive coupled to the receiving element and said forming tool so as to set said receiving part and the forming tool in a gyratory motion relative to each other with an adjustable angle of nutation.

12. A device according to claim 11 wherein, flanks of the tooth recesses in the forming tool extend in an axial direction, and, which, as viewed from an end face of the forming tool, have an axial undercut.

13. A method according to claim 1 wherein:
said gyratory motion between said blank and said forming tool is carried out at an angle of nutation which is increased and thereafter decreased.

14. A device according to claim 11 wherein:
said drive is constructed such that said angle of nutation is increased and decreased during said gyratory motion.

* * * * *